United States Patent [19]

Impink, Jr. et al.

[11] Patent Number: 5,297,174
[45] Date of Patent: Mar. 22, 1994

[54] SAFETY SYSTEM GRADE APPARATUS AND METHOD FOR DETECTING A DROPPED CONTROL ROD AND MALFUNCTIONING EXIT THERMOCOUPLES IN A PRESSURIZED WATER REACTOR

[75] Inventors: Albert J. Impink, Jr., Murrysville; Michael D. Heibel, Penn Township, Westmoreland County; Toshio Morita, Wilkinsburg; Raymond Calvo, N. Huntingdon, all of Pa.

[73] Assignee: Westinghouse Electric Corp., Pittsburgh, Pa.

[21] Appl. No.: 67,280

[22] Filed: May 26, 1993

[51] Int. Cl.$^5$ ............................................. G21C 7/06
[52] U.S. Cl. ........................................ 376/236; 376/217; 376/258; 376/247
[58] Field of Search ............... 376/245, 216, 258, 217, 376/236, 247

[56] References Cited

U.S. PATENT DOCUMENTS

| | | | |
|---|---|---|---|
| 4,637,910 | 1/1987 | Impink | 376/217 |
| 4,774,049 | 9/1988 | Impink et al. | 376/247 |
| 4,927,594 | 5/1990 | Heibel et al. | 376/247 |
| 4,965,040 | 10/1990 | Huston | 376/258 |
| 5,124,641 | 6/1992 | Netter et al. | 376/245 |

OTHER PUBLICATIONS

U.S. Nuclear Regulatory Commission Regulatory Guide—1.153, Dec. 1985; pp. 1 thru 5.
IEEE 603 Standard—IEEE Standard Criteria for Safety Systems for Nuclear Power Generating Stations—1980 by the Institute of Electrical and Electronics Engineers, Inc.—pp. 1 thru 30.
"Detection of Thermocouple Malfunction in the Beacon System", Morita, et al., 1991 Specialist Meeting on Incore Instrumentation and Reactor Core Assessment Organization for Economic Cooperation and Development, Oct. 2, 1991, Pittsburgh, Pa.

Primary Examiner—Donald P. Walsh
Assistant Examiner—Frederick H. Voss
Attorney, Agent, or Firm—J. C. Valentine

[57] ABSTRACT

A safety system grade dropped rod detection system for a pressurized water reactor (PWR) utilizes core exit thermocouples arranged in multiple trains and hot and cold leg RTDs to generate a safety system grade rod stop signal. The system generates from the temperature signals a relative power deviation (RD) and a curvature index (CI), which is the spatial second derivative of RD for each fuel assembly. The CI signatures not only provide rapid, reliable detection of dropped control rods, but also clearly identify failed and failing thermocouples.

10 Claims, 13 Drawing Sheets

SAFETY SYSTEM GRADE APPARATUS AND METHOD FOR DETECTING A DROPPED CONTROL ROD AND MALFUNCTIONING EXIT THERMOCOUPLES IN A PRESSURIZED WATER REACTOR

BACKGROUND OF THE INVENTION

1. Field Of The Invention

This invention is directed to a pressurized water reactor having a safety system grade system for automatically blocking withdrawal of control rods in response to a dropped control rod.

2. Background Of The Invention

The reactivity of a pressurized water reactor is controlled by regulating the concentration of a neutron absorber, such as boron, in reactor coolant circulated through the reactor core, and by control rods which can be inserted into the reactor core. Changes in boron concentration have a core wide effect while the insertion of control rods is more localized. Typically, the control rods are stepped into and out of the core, but can be dropped into the core rapidly to shut down the core should the need arise. It is possible that during normal operation one or more individual control rod drives could malfunction and drop control rods into the core. This results in a reduction in the reactivity of the core with consequent lowering of the average temperature of coolant exiting the core. When this lowering of the average temperature of the coolant exiting the core is detected by the control system, about ten seconds after the actual rod drop, the conventional control system responds to this reduction in temperature by withdrawing specified control rods in order to raise the core average temperature to a set point level. This can result in excessive heat rise in another part of the core as the control system attempts to compensate for the reduction in core reactivity.

In a conventional pressurized water reactor, regulation of the boron concentration is used to control power level with the control rods being manipulated to control power distribution during transients. Even when load following with such a control strategy, only about one-third of the control rods are inserted into the reactor core at power. It has been analytically determined that with such a control scheme, even in the worst case, a dropped rod will not result in a dangerous over-temperature condition in another part of the core. Hence, while a dropped rod has an adverse effect on the operation of a conventional reactor, it is not a critical safety item.

Assignee of the present invention has developed an advanced pressurized water reactor which is protected by passive safety systems. That is, no operator intervention is required to maintain safe operating conditions in the reactor despite various postulated malfunctions. The control strategy for this advanced pressurized water reactor calls for load following primarily with the control rods only and not through regulation of the boron concentration. This results in a wide variation in the combinations of banks of control rods inserted into the core to follow the load and maintain proper power distribution in the core. This makes it impractical to analytically determine whether, with all the possible combinations of rod insertions, there is no situation where a dropped rod would not cause fuel damage in another part of the core.

Thus, there is a need with the advanced pressurized water reactor operated to load follow with the control rods rather than through regulation of boron concentration to have a reliable system for determining if there is a dropped rod. In order to meet the criteria of the advanced pressurized water reactor that all protection systems be passive, any system for detecting a dropped rod must be safety system grade. That is, it must have the degree of reliability that it can operate automatically without the intervention of the human operator. The safety system grade standards are set forth in IEEE Std. 603-1980 which is hereby incorporated by reference. The IEEE Std. 603-1980 standards are mandated by the U.S. Nuclear Regulatory Commission for applications over which the NRC has jurisdiction in Regulatory Guide 1.153 which is also incorporated by reference herein.

It is known to have rod position indicators which track the stepping of the control rods in and out of the reactor core to provide an indication of rod position. It is also known to have rod bottom lights actuated by microswitches when a rod is fully inserted. However, neither of these systems is safety system grade. There are some safety system grade control rod position indicator systems, but they are expensive and cumbersome to maintain.

U.S. Pat. No. 4,774,049 discloses a system which generates on-line, real time displays of reactor core power distributions, and in particular precisely calculates and displays two dimensional core power distributions relative to a reference position. With the use of the described system a skilled human observer can extract an indication of a dropped control rod. However, this system is not of safety system grade and, more importantly, it is not passive. Furthermore, it cannot readily allow the human observer to recognize a failing thermocouple.

There is a need, therefore, for an improved, fully automatic system and method for identifying a dropped rod in a pressurized water reactor, and in particular for such a system which is safety system grade.

There is also a need for such a system and method which can distinguish between a dropped rod and a failure in the system itself.

SUMMARY OF THE INVENTION

These and other needs are satisfied by the invention which is directed to a method and safety system grade apparatus for detecting a dropped rod in a pressurized water reactor. In particular, the invention is directed to a method and apparatus for detecting a dropped rod and automatically blocking the reactor rod control system from withdrawing control rods from the reactor core when a dropped rod is detected. A dropped rod is detected using core exit thermocouples and a processor which analyzes the signals generated by the thermocouples to identify a dropped rod. In particular, the thermocouple signals are used together with temperature sensors measuring average core inlet and outlet temperatures, preferable through hot and cold leg temperature sensors, to generate for each thermocouple position a relative power deviation between the temperature rise in the fuel assembly at the thermocouple location and the temperature rise across the reactor vessel, relative to reference conditions. The relative power deviations for the remaining fuel assemblies at which there are no thermocouples are extrapolated, preferably using known surface spline fit techniques. Curvature indices, which are indicative of the spatial second derivatives of the relative power distributions, are then calculated for all of the fuel assemblies. The curvature indices for the fuel assemblies having control rods, and for the adjacent fuel assemblies, preferably the laterally adjacent fuel assemblies, are then analyzed to detect a dropped rod and to differentiate a failed thermocouple from a dropped rod.

BRIEF DESCRIPTION OF THE DRAWINGS

A full understanding of the invention can be gained from the following description of the preferred embodiment when read in conjunction with the accompanying drawings in which:

FIG. 3 is a diagram schematically illustrating a pattern of curvature indices in accordance with the invention produced by a dropped control rod.

FIG. 4A is a diagram similar to FIG. 3 contrasting a pattern of curvature indices produced by a failed thermocouple.

DESCRIPTION OF THE PREFERRED EMBODIMENT

Figure 1:
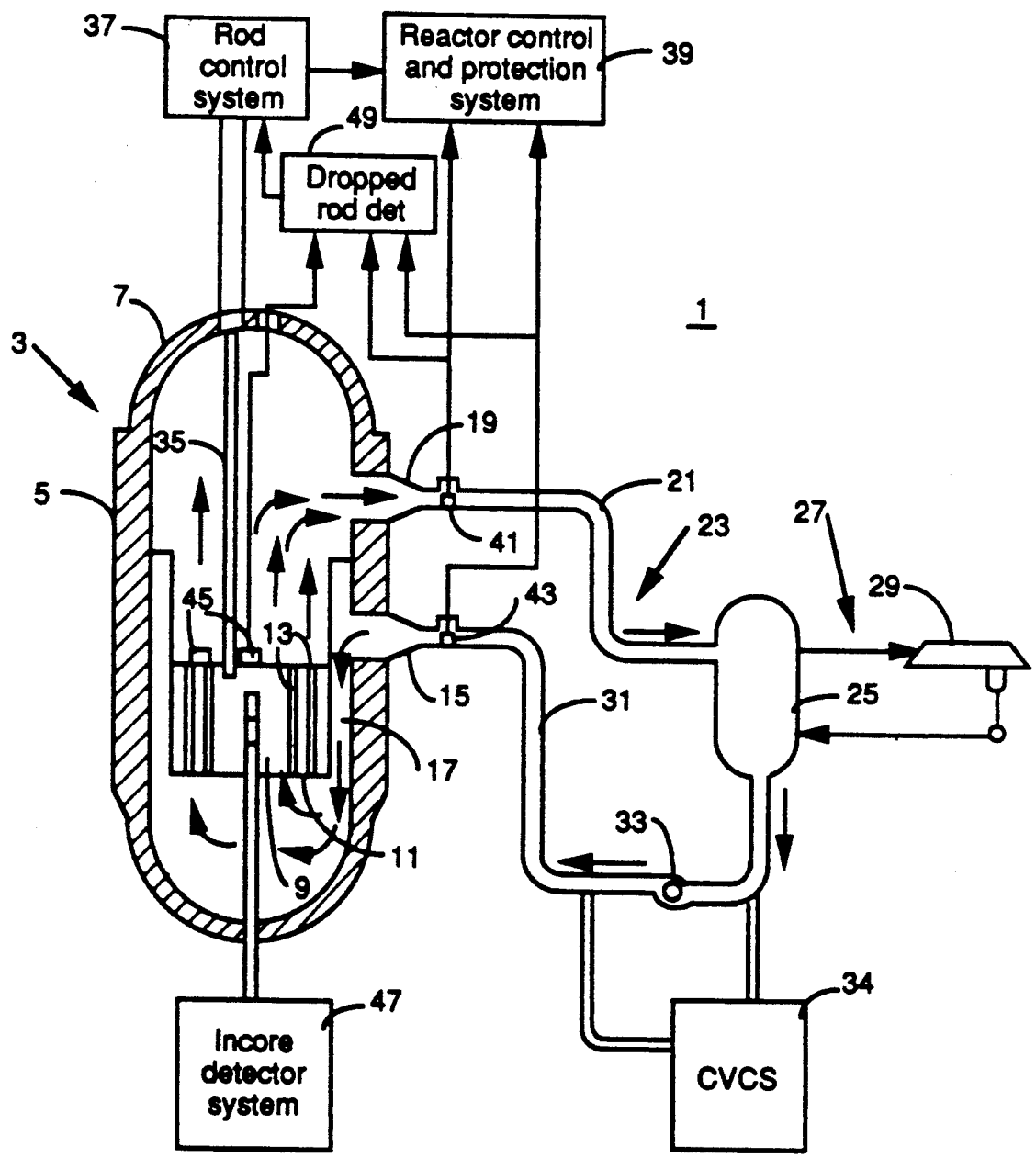
FIG. 1 is a schematic diagram of a pressurized water reactor electric power generation system incorporating the invention.

FIG. 1 is a schematic representation of a nuclear steam supply system 1 incorporating a typical pressurized water reactor (PWR) 3 in which the present invention is implemented to detect dropped control rods and malfunctioning thermocouples. The PWR 3 includes a reactor vessel 5 which forms a pressurized container when sealed by a head assembly 7.

The reactor vessel 5 houses a reactor core 9 made up of a matrix of fuel assemblies 11. The fuel assemblies in turn contain a number of fuel rods 13 containing fissionable material. Fission reactions within the fuel rods 13 generate heat which is absorbed by a pressurized reactor coolant, for example light water, which is passed through the core 9. The reactor coolant enters the vessel 5 through inlet 15 and flows downward through an annular down-comer 17 and then upward through the fuel assemblies 11 where it is heated by the heat of the fission reactions. The heated reactor coolant flows upward out of the reactor core and through an outlet 19 into the hot leg 21 of a primary loop 23. The hot leg 21 delivers the heated reactor coolant to a steam generator 25 where feed water is converted into steam which is circulated in a secondary loop 27 to drive a turbine-generator 29 which generates electric power. Reactor coolant is returned to the inlet 15 through a cold leg 31 by a reactor coolant pump 33. Only one steam generator 25 in one primary loop 23 is shown in FIG. 1 for clarity; however, as is known, the typical PWR nuclear steam supply system 1 has two to four primary loops, each with its own steam generator 25 generating steam, and a comparable number of secondary loops 27 driving the single turbine-generator 29.

The reactivity of the reactor core 9 is controlled by regulation of the concentration of a neutron absorber dissolved in the reactor coolant by a reactor chemical and volume control system CVCS 34 and by control rods 35 which are inserted into and withdrawn from the reactor core 9 by a rod control system 37 as discussed above. The rod control system 37 inserts and withdraws banks of control rods under the direction of a reactor control and protection system 39. Inputs to the reactor control and protection system 39 include hot and cold leg reactor coolant temperatures measured by temperature sensors such as RTDs 41 and 43, respectively. Additional monitored reactor parameters include core exit temperatures measured at selected fuel assemblies as discussed below by core exit thermocouples 45. An in-core detector system 47 maps power distribution in the core on a periodic basis. The dropped rod detection system 49 utilizes the signals generated by the hot leg and cold leg temperature sensors 41 and 43 and the core exit thermocouples 45 to detect a dropped control rod 35 and generate a signal which is applied to the rod control system 37 to block the withdrawal of control rods.

Figure 2:
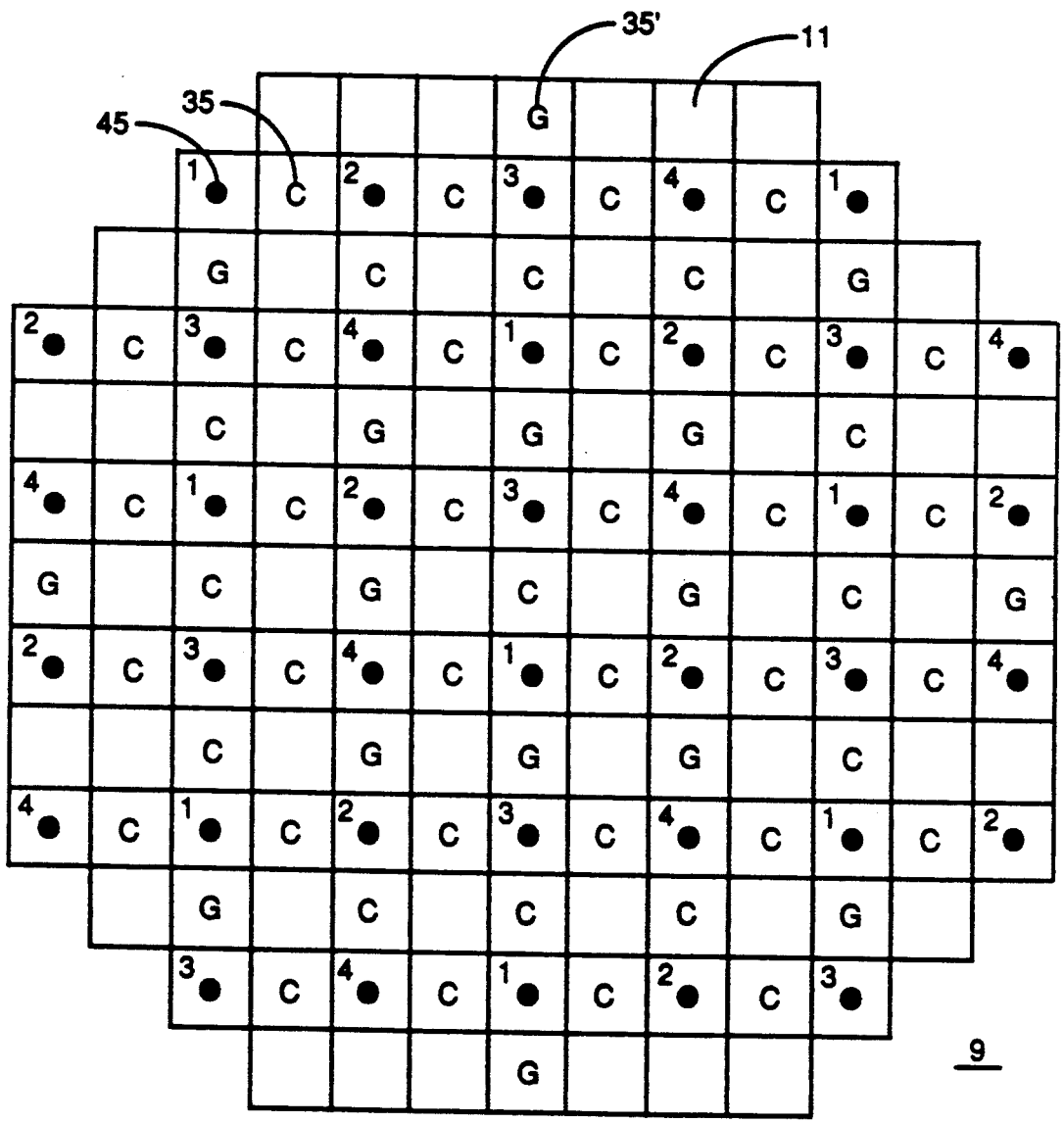
FIG. 2 is a schematic cross section of the core of the pressurized water reactor shown in FIG. 1.

The exemplary PWR 3 is an advanced system which, as discussed previously, is designed to load follow primarily through movement of the control rods rather than through regulation of the concentration of neutron absorber in the reactor coolant. Such reactors have in addition to control rods containing neutron absorbing material, gray rods with more moderate neutron absorbing materials which are provided to maintain appropriate power distribution in the core 9. FIG. 2 illustrates the arrangement of fuel assemblies 11 in the reactor core 9 of the exemplary PWR 3 with the conventional rods 35 depicted by the letter C, and the gray rods 35' indicated by the letter G. For purposes of this description, references to control rods 35 will include both the conventional control rods (C) and the gray rods (G) unless otherwise specified. The control rods 35 in a single fuel assembly form a cluster operated by a common mechanism, while groups of clusters are ganged together electrically to form banks of control rods, as is well known. The arrangement of the control rods into banks is not specified in FIG. 2 as it is not necessary to an understanding of the invention.

The core exit thermocouples 45 are mounted in instrumentation thimbles provided in about a quarter of the fuel assemblies 11. As illustrated in FIG. 2, the core exit thermocouples are distributed in a regular pattern across the fuel assemblies 11 so that core exit thermocouples 45 are located in fuel assemblies that are laterally adjacent to every one of the conventional control rods clusters C and all but two of the gray rod clusters G. The only exceptions are two gray rod clusters G on the periphery of the core 9, each of which has one core exit thermocouple in a laterally adjacent fuel assembly. In addition, there are at least two, and more commonly, four core exit thermocouples 45 in fuel assemblies located a chess knight's move from each control rod C and gray rod cluster G location. Hence, a system divided into two completely independent trains of core exit thermocouples can readily be supported. However, the preferred embodiment of the invention adopts a four train system which requires an internal mutual exchange of information among the trains at one point in the computational process. The exemplary PWR 3 utilizes single core exist thermocouples distributed in four trains in the pattern indicated by the numerals 1-4 next to the thermocouples 45 in FIG. 2.

In order for the dropped rod detection system of the invention to qualify as safety system grade, the entire system, including the core exit thermocouples 45, must be certifiable as meeting full Class IEEE-603 standards.

The temperatures measured by thermocouples 45 are determined primarily by the power distribution. When thermocouple readings exhibit sudden changes, they may be caused by either: (a) a sudden change in the core condition; or (b) thermocouple malfunctions. In the former case, the thermocouple readings change and their spatial distribution must be governed by physical principles. However, in the latter case, a controlling physical principle is not applicable. In order to simplify the evaluation between these possibilities, a new parameter is introduced, the Relative Power Deviation, RD, which is defined by:

$$RD(L,M) = 100 \left[ \frac{\Delta T(L,M)}{\Delta T_O(L,M)} \cdot \frac{\Delta T_{OAvg}}{\Delta T_{Avg}} - 1.0 \right] \quad \text{(Eq. 1)}$$

where:
(L,M) = Thermocouple location
$\Delta T$ = Temperature rise in assembly
$\Delta T_O$ = Temperature rise in assembly at reference condition
$\Delta T_{Avg}$ = Temperature rise across reactor vessel
$\Delta T_{OAvg}$ = Temperature rise across reactor vessel at reference condition It should be noted that although RD values are defined herein in terms of temperature, the definitions could also be cast in terms of enthalpy.

While RD can be calculated by Eq. 1 only for those fuel assemblies 11 having core exit thermocouples, RD values for all fuel assemblies can be interpolated through use of a surface spline fit, as is well known in the art. Each thermocouple 45 measures an assembly exit temperature, which defines a temperature rise with respect to the inlet temperature. RD represents the percent change in the normalized power distribution, with respect to the reference shape. It is important to note that if the power spatial distribution is unchanged, RD remains at the value zero, regardless of power level.

As the power distribution changes from the reference shape, RD values become non-zero. The spatial distribution of RD is governed by the neutron diffusion equation. When the power distribution experiences a large change, by insertion of control rods 35 for example, RD also changes by a large amount; however, its spatial variation is smooth, except at the rod insertion location. This is similar to the behavior of the neutron flux distribution. In order to quantify the smoothness of the distribution, another parameter, the Curvature Index, CI, is introduced. CI is defined as follows in an x-y array of assemblies indexed by the coordinates (i,j):

$$CI(i, j) = 4 \cdot RD(i,j) - [RD(i-1,j) + RD(i+1, j) + RD(i, j-1) + RD(i,j+1)] \quad \text{(Eq. 2)}$$

Mathematically, CI approximates the negative of the spatial second derivative of RD. When the power distribution changes due to control rod insertion, a large value of CI occurs only at the rodded location. In other locations, the value of CI should be small, in spite of a large variation of RD throughout a wide area. However, if a large value of RD is the result of a thermocouple malfunction, CI of the surrounding assemblies will also be large. In the validation of thermocouple signals, this is the principle used to distinguish true changes in the physical condition of the core from detector malfunctions.

When looking for "bad thermocouple" signatures, the most meaningful CI values are those found in the location of the location of the suspect thermocouple and in the four laterally adjacent fuel locations. The characteristics of a "bad thermocouple" signature are:

a relatively high positive or negative CI value at the thermocouple location.

smaller but still fairly large CI values (typically about one-fourth of the center CI value) and of opposite sign to the center CI value in most (frequently all) of the four laterally adjacent fuel assembly locations.

noise level, random sign values of CI in the four diagonally adjacent fuel assembly locations.

virtual disappearance of the relatively large, opposite sign values of CI in the four laterally adjacent fuel assembly locations if the RD value at the suspect thermocouple location is given a high lack of confidence value (i.e., ignored), the RD spline fit is rerun, and the CI's reevaluated.

The sign of the center CI value is indicative of the direction of the thermocouple signal error—positive indicates error high. The magnitude of the center CI value is roughly proportional to the magnitude of the signal error.

If a moved (including "dropped") control rod is suspected, the CI values in all nine of the fuel locations in the 3×3 array centered on the rod location contribute to the signature pattern. The characteristics of the "moved control rod" signature are:

again, a relatively high positive or negative CI value at the location of a control rod or gray rod (in the exemplary reactor thermocouples and control or gray rods never share a common location).

much smaller CI values of the same or opposite sign as the center CI value in the laterally and diagonally adjacent fuel locations. (Whether the CI values are of the same or opposite sign depends on which thermocouples are operational in the near vicinity, i.e., the values of nearby CI's are influenced to some degree by the spline fit algorithm.

The sign of the center CI value reflects the direction of movement of the control rod—a negative center CI value indicates rod insertion. The magnitude of the center CI value is roughly proportional to the amount of reactivity (positive or negative) inserted locally by rod movement.

Important keys to the signature differentiation process are two: (1) is the maximum CI value at a thermocouple location or on a control rod/grey rod location?

If at a control rod/grey rod location, almost certainly the rod has moved. (2) if the maximum CI value is at a thermocouple location, reprocessing the RD fit and CI evaluation with the suspect RD value discarded will show a recognizable change in the CI values at laterally adjacent fuel assembly locations.

Figures 3, 4A:
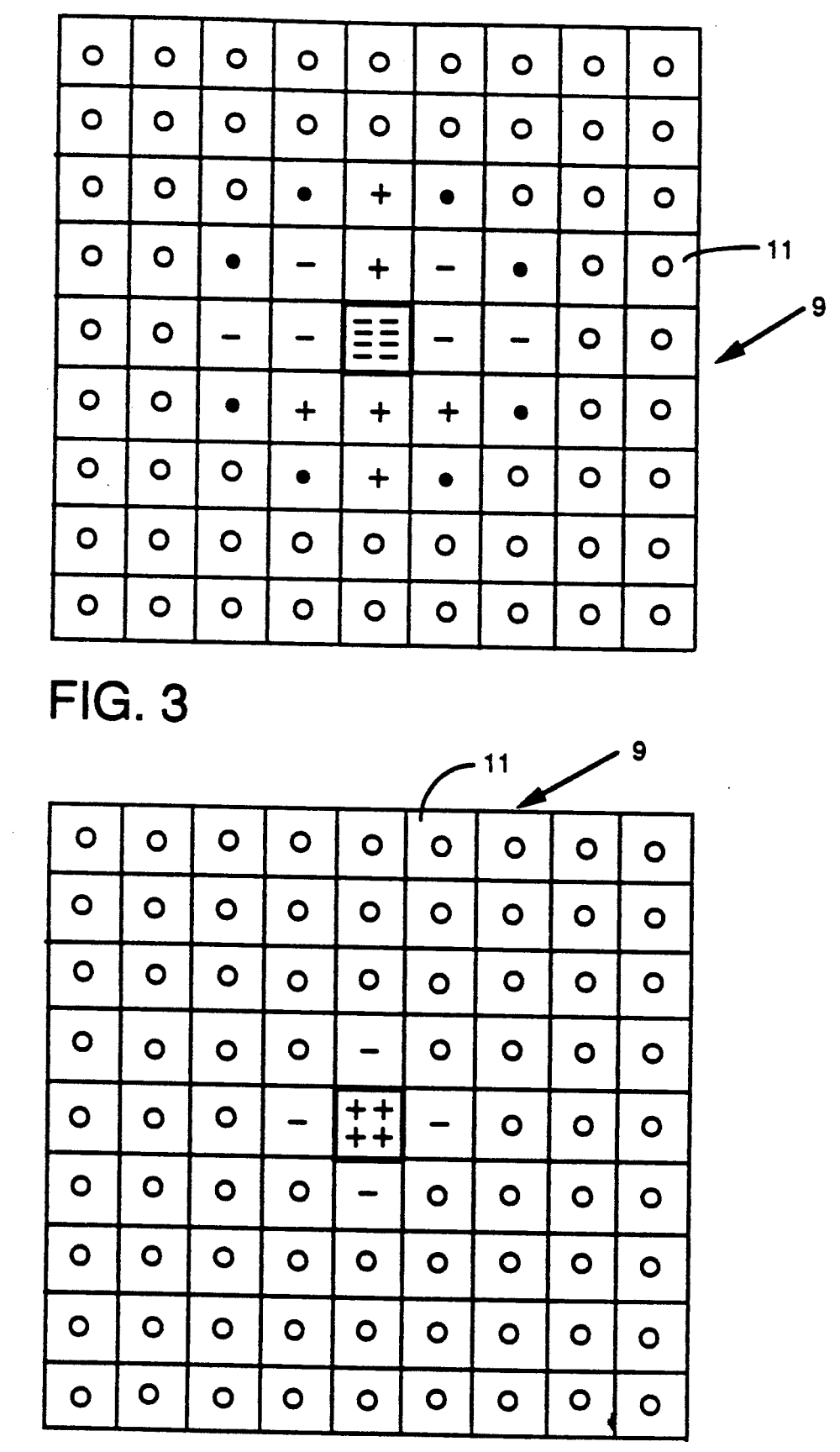
Figure 4B:
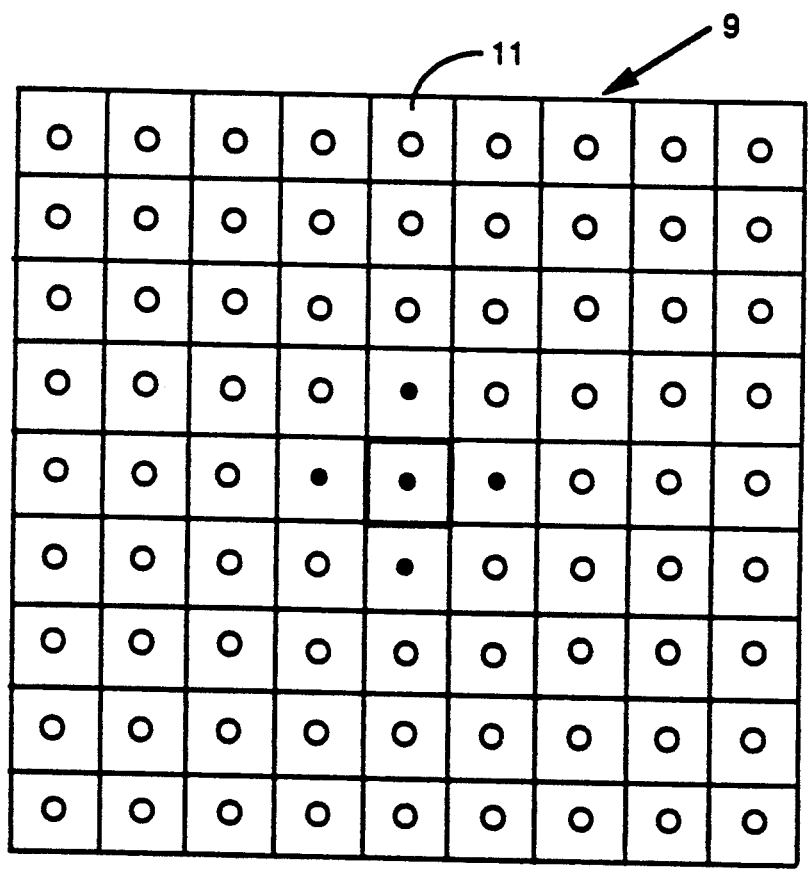
FIG. 4B is a reiteration of FIG. 4A in which the curvature indices have been recalculated ignoring the suspected failed thermocouple.

An example of the ability of the invention to distinguish between a dropped rod and a malfunctioning thermocouple is illustrated by FIGS. 3, and 4A and 4B which plot the values of CI for the fuel assemblies in the vicinity of a dropped rod, and in the vicinity of a failed thermocouple respectively. Each (−) and (+) represent an arbitrary unit of CI, while the dots represent partial units of random sign. As can be seen from FIG. 3, there is a large negative CI at the location of a dropped rod in the center of the figure in the fuel assembly 11 outlined in heavy line. It will be noticed that the CI's in the laterally and diagonally adjacent fuel assemblies are of either sign and are much smaller in magnitude than the CI of the assembly with the dropped rod. Also, it will be noted that the CI's of the fuel assemblies 360° around and several assemblies away from the assembly with the dropped rod are affected. On the other hand, it can be seen in FIG. 4A that only the CI's for the fuel assemblies laterally spaced on the cardinal axes from the fuel assembly with a failed thermocouple are affected. Most importantly, it can be seen that the CI's for the laterally adjacent fuel assemblies are always of opposite sign from that of the fuel assembly with the failed thermocouple, and that the function falls off more rapidly than in the case of a dropped rod. FIG. 4B illustrates the distribution of CI values calculated from RD values generated from a surface spline fit in which the RD value for the suspect thermocouple is given a high lack of confidence factor. As can be seen, only very small disturbances even at the location of the suspect thermocouple are indicate. Again, the disturbances only extend to the four laterally adjacent fuel assembly locations.

Figure 5:
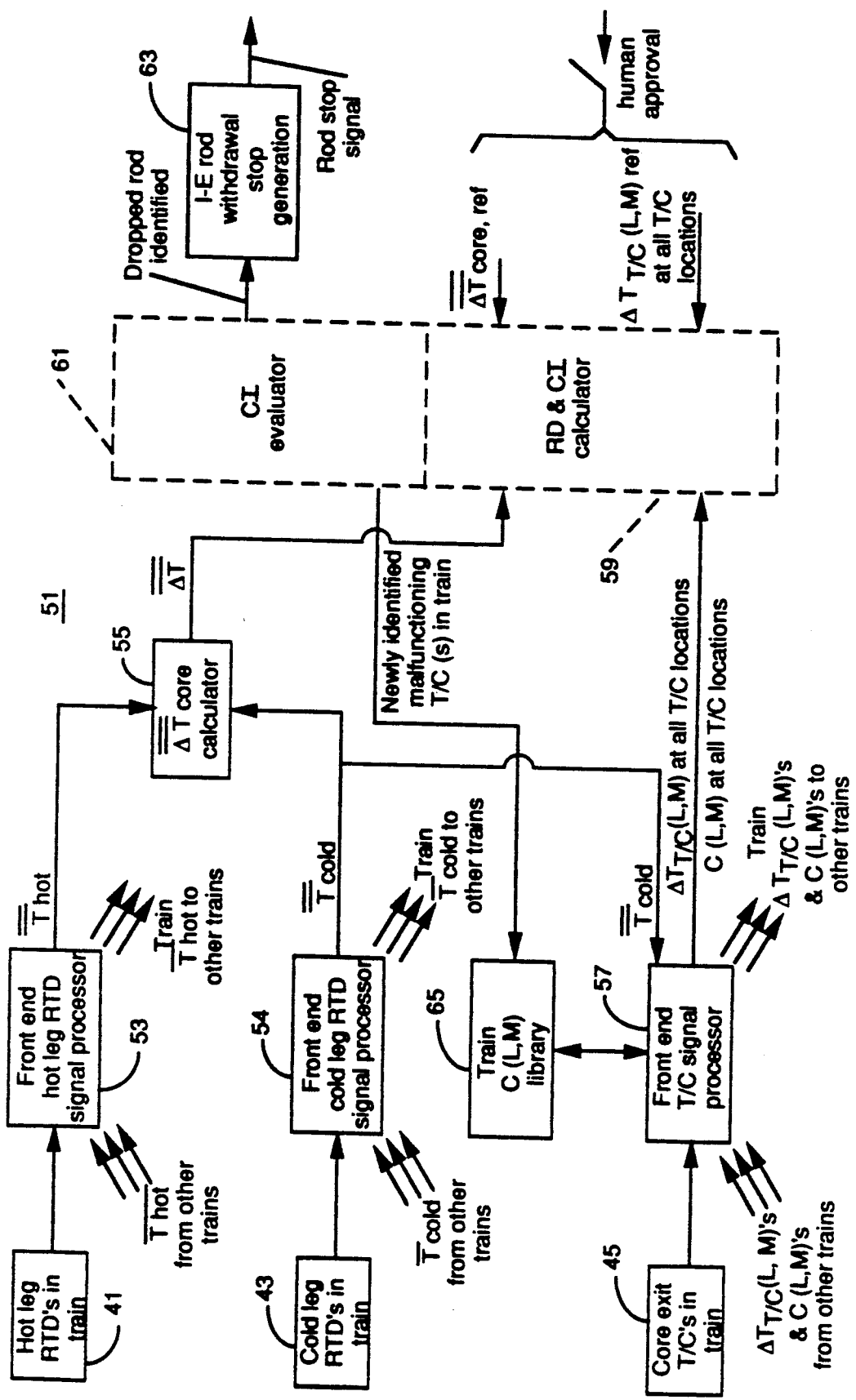
FIG. 5 is a block diagram of one of four trains of a system for automatically blocking withdrawal of the control rods from the pressurized water reactor of FIG. 1 upon detection of a dropped rod.

FIG. 5 is a block diagram of one of four trains 51 of the dropped rod detector system 49. The illustrated train 51 of the dropped rod detector system 49 includes a front end hot leg RTD signal processor 53. This processor digitizes ohm signals received from the hot leg RTD's 41 (typically three) in the train and converts the digital ohm signals to degrees Fahrenheit. The processor 53 then generates an average $\overline{T}_{hot}$ temperature for the train. This average temperature $T_{hot}$, is sent to all of the other trains. The processor 53 receives the average hot leg temperatures $\overline{T}_{hot}$ generated by all of the other trains and generates therefrom an average, average $\overline{\overline{T}}_{hot}$ signal.

Each train 51 also includes a front end cold leg RTD signal processor 54 which similarly digitizes ohm signals from the cold leg RTDs 43 in the train and converts them to degrees Fahrenheit. The processor 54 then generates train average $\overline{T}_{cold}$ signal which is sent to all of the other trains. The processor 54 then generates an average, average cold leg temperature $\overline{\overline{T}}_{cold}$ from the $\overline{T}_{cold}$ signals from all of the trains.

A calculator 55 generates from the $\overline{\overline{T}}_{hot}$ and $\overline{\overline{T}}_{cold}$ signals a $\Delta \overline{\overline{T}}_{core}$ signal which is the average temperature rise across the core.

The train 51 also includes a front end thermocouple (TC) signal processor 57 which, when the train is in service, digitizes voltage signals generated at each of the thermocouples in the train having coordinates L,M and converts them from millivolts to degrees Fahrenheit. The T/C signal processor 57 also identifies obviously failed thermocouples, both failed open and failed closed. In both cases, the processor 57 sets a lack of confidence, or tolerance, factor C (L,M) used in the surface spline fit to a large value (approximately 1,000, for example). As is well known, the lack of confidence factor C smooths out the surface spline fit by allowing the surface generated to deviate at a data point by an amount which is a function of the magnitude of the lack of confidence factor C at that point.

The T/C signal processor 57 computes for each thermocouple a $\Delta T_{T/C}(L,M)$ which is the difference between the thermocouple reading and the average inlet temperature reading, $\overline{\overline{T}}_{cold}$, provided by the processor 54. These $\Delta T_{T/C}(L,M)$ values and C (L,M) values for the train are sent to all the other trains. Similarly, the processor 57 receives the same values from the other trains and outputs all of them to an RD and CI calculator 59.

If the train 51 is not in service, because of train failure or because it is in the test mode, the front end T/C signal processor 57 sets all the $\Delta \overline{\overline{T}}_{T/C}(L,M)$ in the train to $\Delta \overline{\overline{T}}_{core}$. In addition, all C (L,M) in the train are set to a large value (approximately 1,000). Again, these values are sent to all the other trains and the corresponding values from all the other trains are received to generate a complete set of values which is sent to the calculator 59.

As will be discussed in more detail below, RD and CI calculator 59 utilizes the $\Delta T_{T/C}$ and C signals from the T/C signal processor 57 and the $\Delta \overline{\overline{T}}_{core}$ from the calculator 55 together with reference values for $\Delta T_{T/C}$ and $\Delta \overline{\overline{T}}_{core}$ to generate the CI values for all of the fuel assemblies 11 which are then used by a CI evaluator 61 which identifies any dropped rods. The dropped rod signal is applied to a safety system grade rod withdrawal stop generation module 63 which generates a rod stop signal for the train.

The CI evaluator 61 also identifies failed thermocouples. The front end processor 57, in effect, throws out obviously failed thermocouples by setting their C values to a large number. As a result, the CI evaluator will essentially ignore such thermocouples and concentrate on the questionable thermocouples. This would include those which are not completely failed but are unreliable. The identification of malfunctioning thermocouples is stored in a library 65 together with the large C values for such failed thermocouples. The library 65 also stores the identification of failed thermocouples detected by the processor 57.

Figure 6:
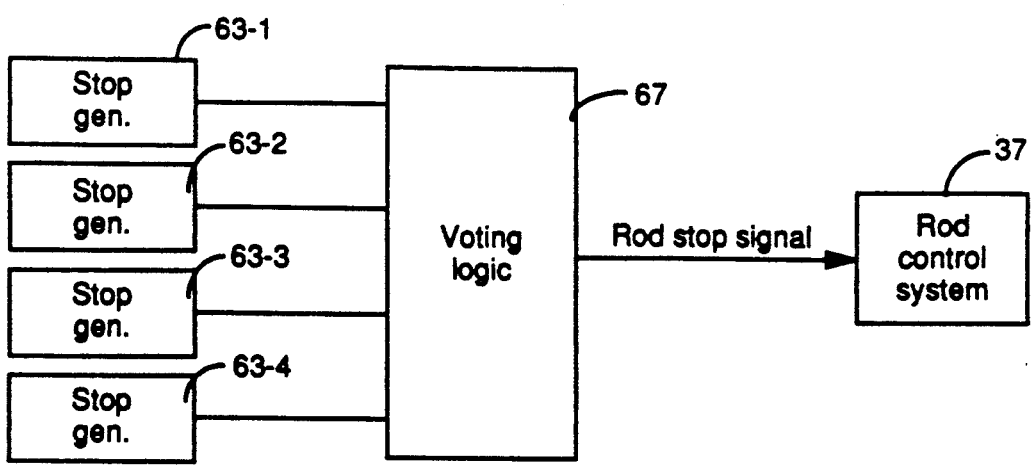
FIG. 6 is a block diagram illustrating integration of the multiple trains for blocking rod withdrawal in accordance with the invention.

As discussed previously, the structure 51 illustrated in FIG. 5 is provided for each of the four trains of the dropped rod protection system. As shown in FIG. 6, the rod stop signals generated by the stop generators 63-1 to 63-4 for each of the four trains is input to voting logic 67 which, as is well known in the art, generates a block rod withdrawal signal in the presence of a selected combination of train rod stop signals such as, for example, two out of four, or if one train is out of service, two out of three. The block rod withdrawal signal is applied to the rod control system 37 to prevent withdrawal of the control rods in response to a dropped rod.

Figure 7:
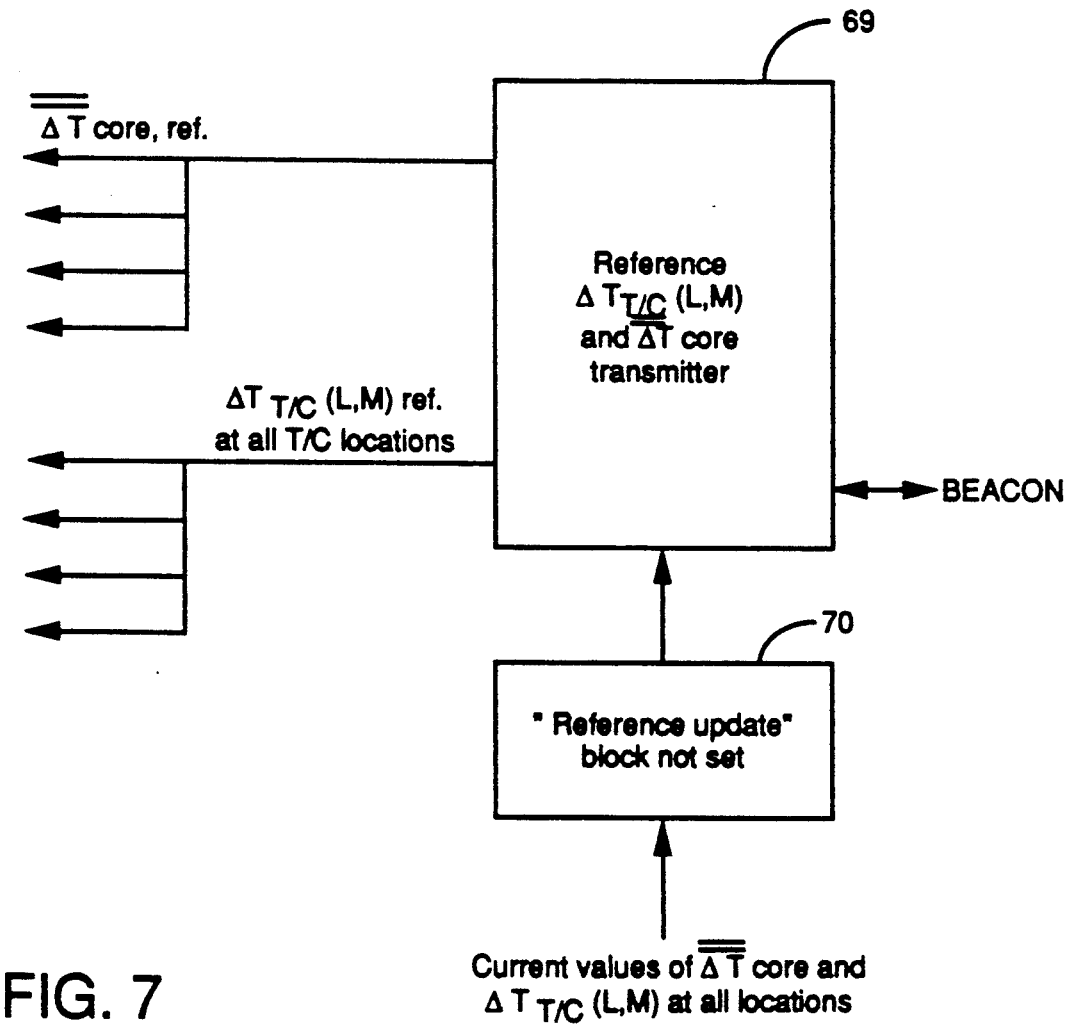
FIG. 7 is a block diagram illustrating generation of reference signals for each of the trains shown in FIG. 5.

As shown in FIG. 7, a common reference transmitter 69 provides $\Delta \overline{\overline{T}}_{core/REF}$ and $\Delta T_{T/C}(L,M)_{REF}$ values for all thermocouple locations to each of the four trains of the dropped rod protection system. As the banks of control rods move, maps of the CI values across the core will show progressively greater symmetric distortion, reflecting the deviation of the current rod configuration from that under which reference conditions were established. This is perfectly normal, but none the less highly confusing to a computer. Accordingly, it is highly desirable to periodically update the reference values of $\Delta \overline{T}_{core/REF}$ and $\Delta T_{T/C}(L,M)_{REF}$. These references values are updated, utilizing a software core surveillance program such as BEACON, which is typically run at, for example, 15 minute intervals. BEACON, which is available from Westinghouse Commercial Nuclear Fuels Divisions, is an analytical tool which calculates a three dimensional nodal power distribution in the core utilizing either excore power range detectors and core exit thermocouples or fixed incore detectors. Since the reference transmitter 69, and BEACON which interfaces with it, are not safety system grade, the reference signals provided by the reference transmitters 69 are subject to human approval as shown functionally by the switch 71 in FIG. 5. If there is reason for the operator to believe that the reference values are not valid, approval of the reference values can be withheld. Also, as discussed in connection with FIG. 11 below, updating of the references can be prevented by a block indicated at 70 when misalignment of a control rod is detected.

A method for updating the reference values is to (a) monitor the CI values at symmetric control rod locations of the controlling groups. These values will steadily increase in absolute magnitude as the control rods are moved farther and farther from the positions they were at when the last reference set of values was established. (b) when the monitored CI values reach a preselected absolute magnitude, display to the operator the bank position that corresponded to the still current reference values and an indication of the net direction of bank movement from that position. The operator must then attempt to confirm, using the rod position indicators, that the dropped rod protection septum has successfully tracked the trend of control bank movement. If no alarms to the contrary exist and if he is satisfied that the protection system is at least trending properly, he must authorize replacing the set of reference values that had been in use with the current set of those parameters. The key ingredient here is the operator's verification that the system is apparently working correctly. (c) if one of the "anomalous train behavior" or anomalous rod/bank movement type alarms is generated, an update "block" is activated and the current values can not be made reference values. If the operator is not satisfied that the system is trending properly he must withhold approval to update the reference values. In either event, and assuming that any system malfunctions have been corrected, the operator must verify that the BEACON core surveillance system is running correctly, i.e., no significant differences exist between various measurable aspects of core power distribution such as incore detector signals and the equivalent analytically predicted values. If BEACON is seen to be generating a reliable estimate of core power distribution, the operator can authorize the current BEACON estimates of $\Delta \overline{T}_{core}$ and $\Delta T_{T/C}$ for all thermocouples to be established as the new set of reference values for the dropped rod protection system. Since BEACON runs continuously on-line it is always current with core operations. (d) if the reference values cannot be updated when needed, administrative controls, such as setting very conservative rod insertion limits to insure that the core will survive one or more dropped rods without damage, must be imposed until the situation is corrected.

Figure 8:
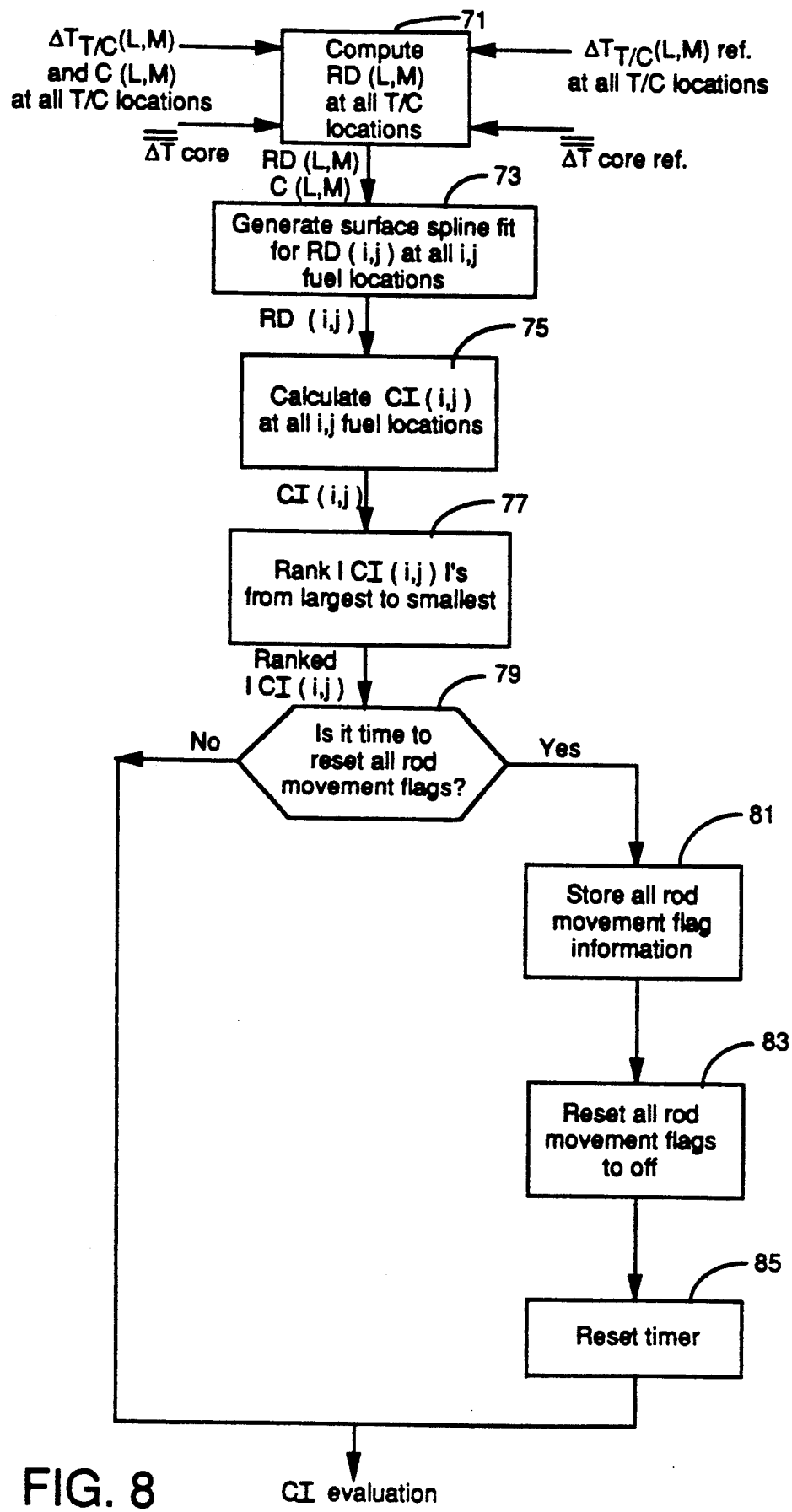
FIG. 8 is a flow chart for the relative power deviation (RD) and curvature indices (CI) calculator for the train shown in FIG. 5.

FIG. 8 illustrates a flow chart for the RD and CI calculator 59. Utilizing the information from the $\Delta T$ calculator 55 and the T/C signal processor 57 as well as the reference information from the reference transmitted 69, the calculator 59 computes RD (L,M) at all thermocouple locations using equation 1 as indicated at 71. Using these RD values and the corresponding lack of confidence factors C for those locations, a surface spline fit is used at 73 to generate the relative power deviation RD for all fuel assemblies (i,j). These values are then used to calculate the curvature indices CI (i,j) for all fuel assemblies 11 using equation 2 as indicated at 75. The curvature indices are then ranked by magnitude at 77.

The system, of course, also detects normal movement of the control rods. Periodically, such as for example, every 10 minutes, as determined at 79, the status of flags indicating rod movement is stored at 81, the flags are reset at 83 and a timer for the period is reset at 85.

Figure 9A:
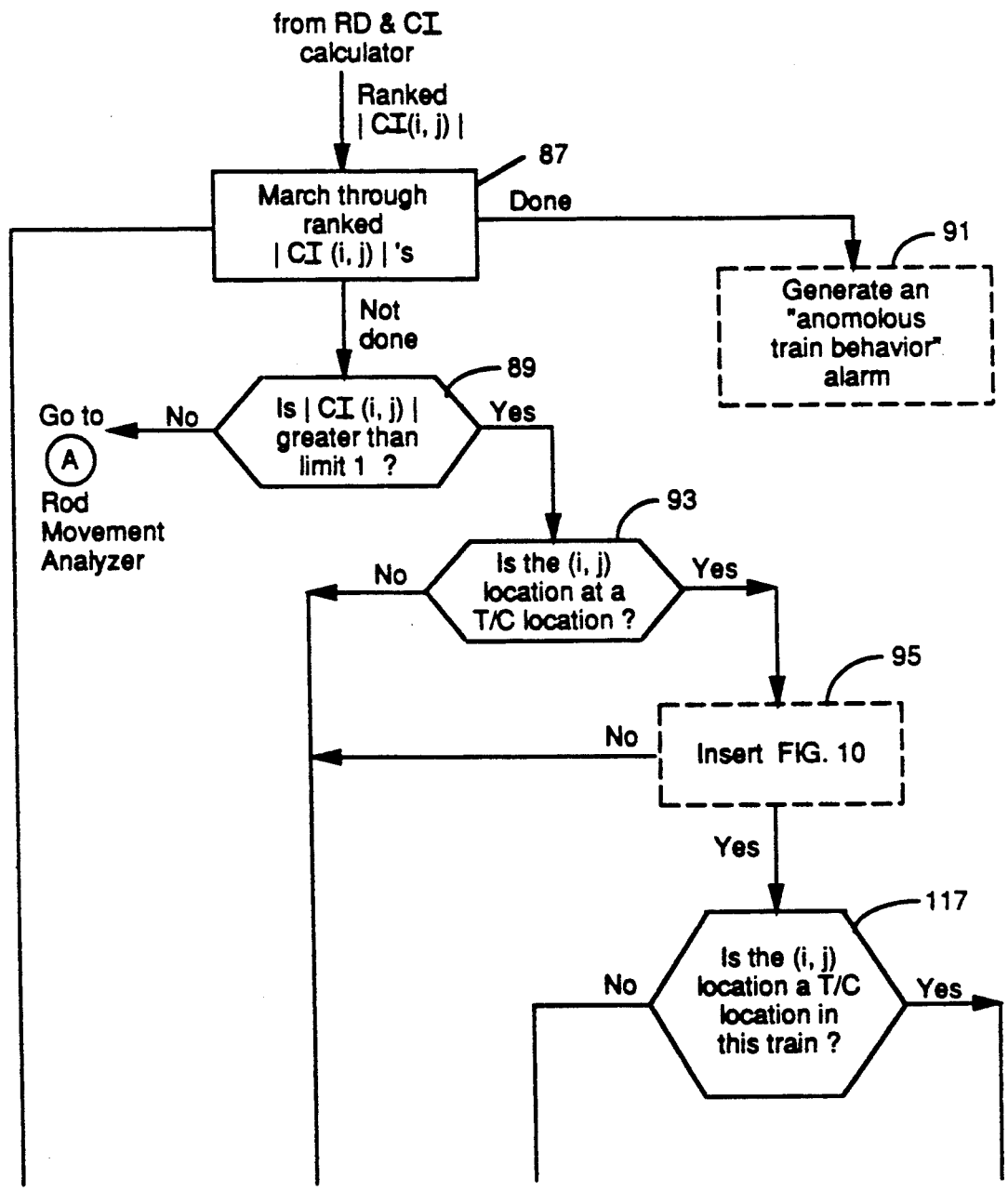
FIGS. 9A-9C illustrate a flow chart for the CI evaluator for the train shown in FIG. 5.
Figure 9B:
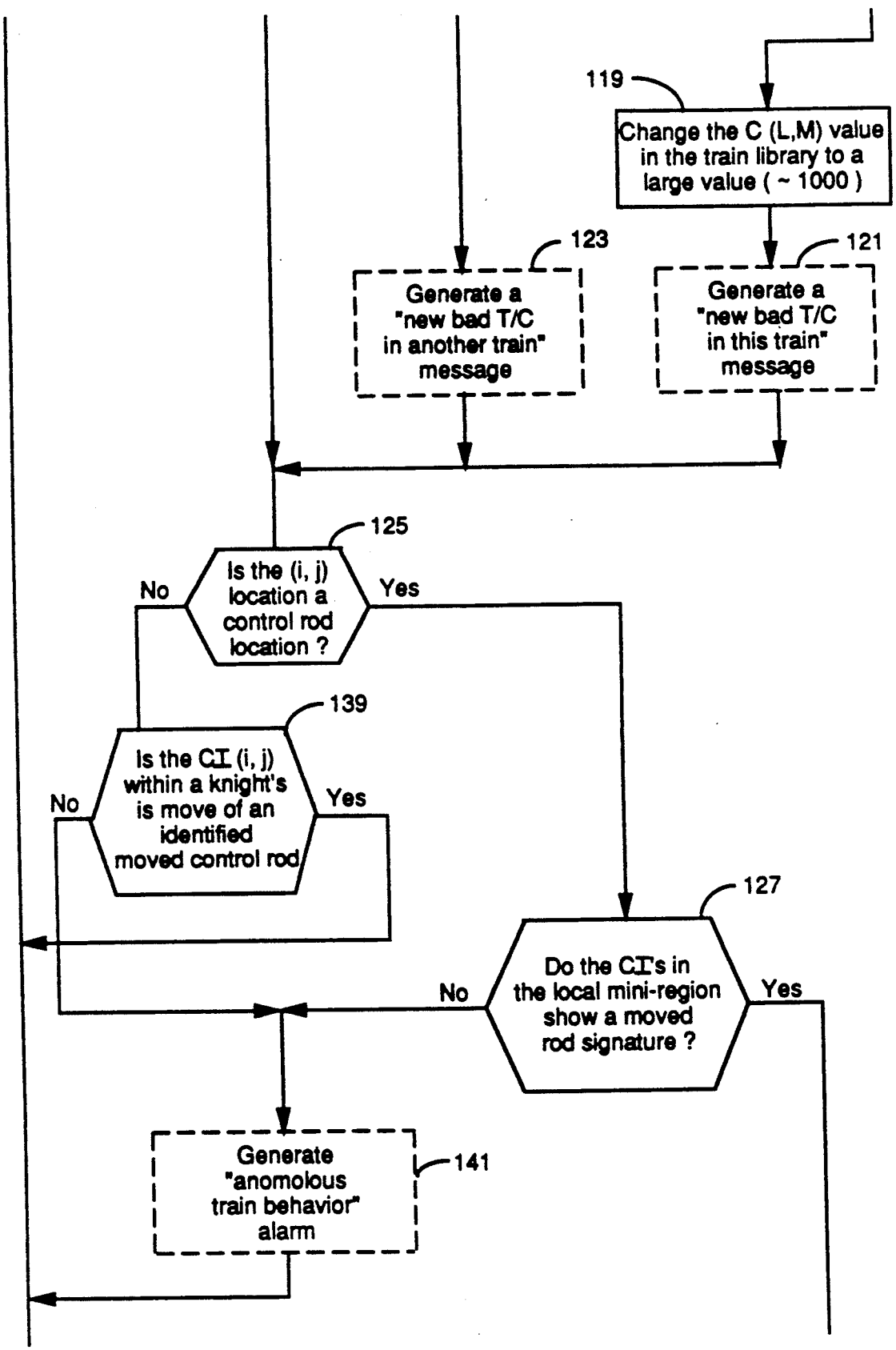
Figure 9C:
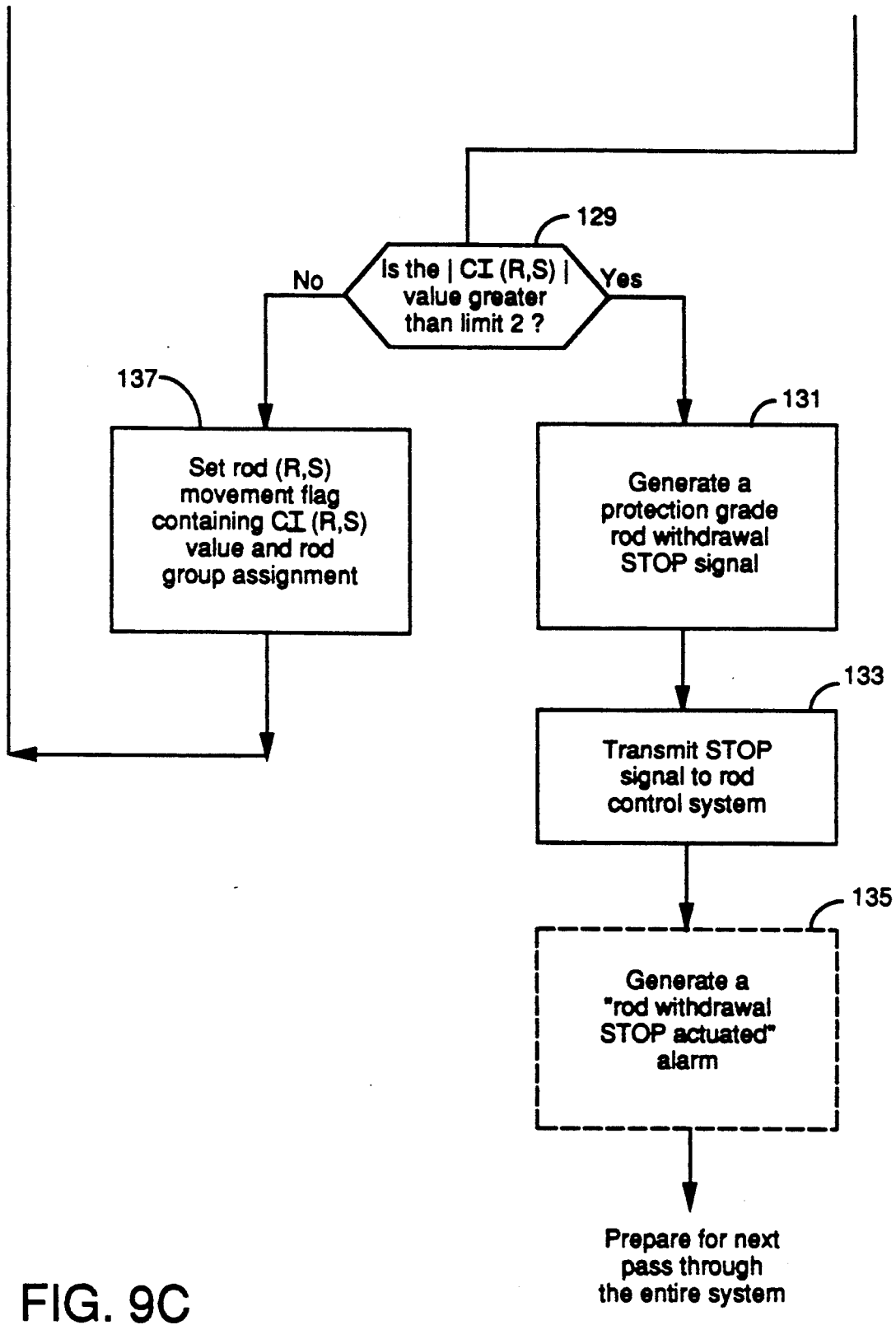
Figure 10:
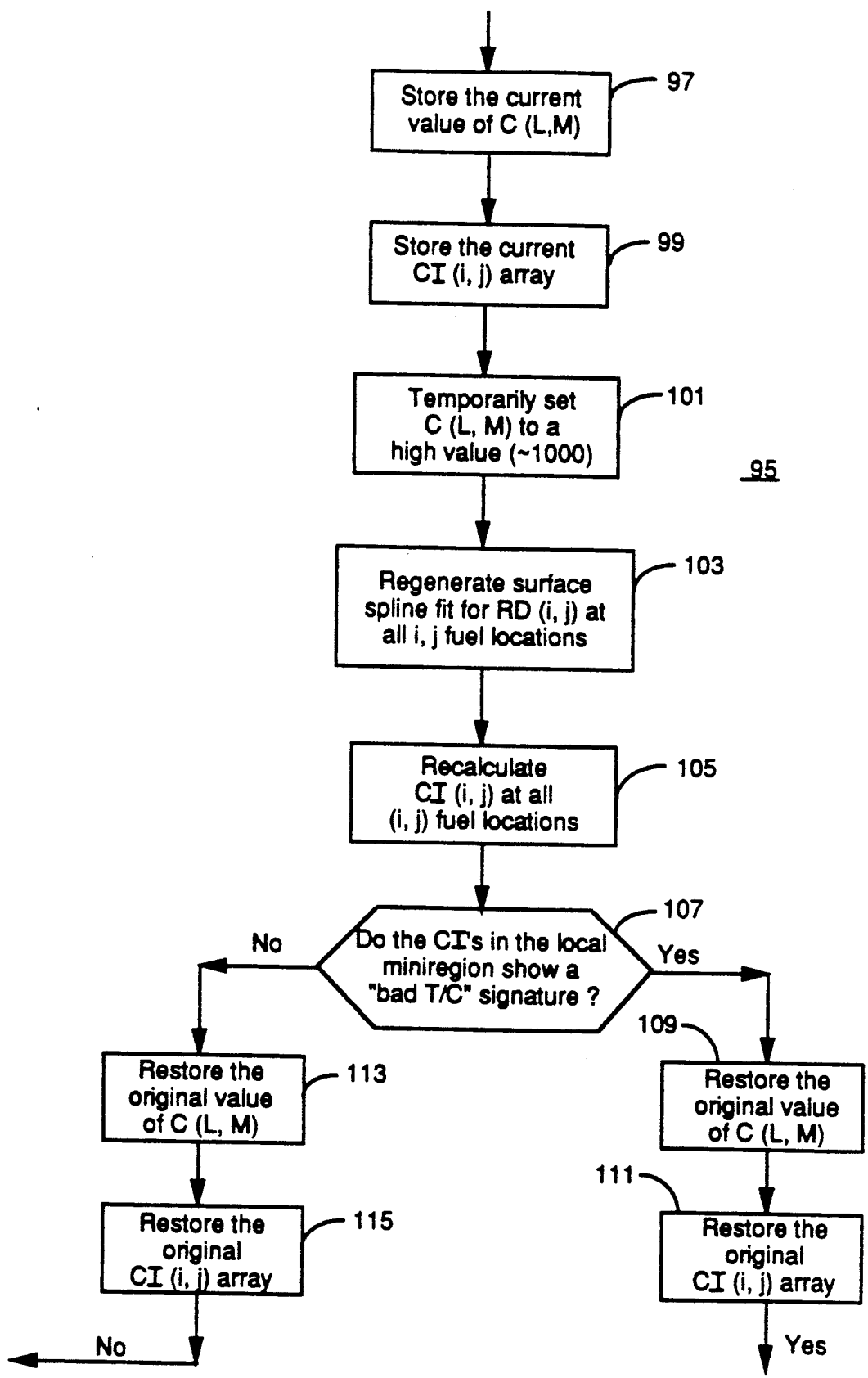
FIG. 10 is an insert for the flow chart of FIG. 9.

The flow chart for the CI evaluator 61 is shown in FIGS. 9A–9C with an insert which is FIG. 10. The CI evaluator cycles through the ranked CIs in descending absolute order as indicated at 87. Only those absolute CI values which are greater than a first limit as determined at 89 are examined. This limit 1 is selected so that only signals above the expected noise level need be examined. When all of the significant CIs have been examined, the CI evaluator is exited and the program transfers to the rod movement analyzer shown in FIGS. 11A and 11B. If the evaluator cycles through all of the CIs, indicating that all of the CIs are above the first limit, which is not a valid condition, "an anomalous train behavior" alarm is generated at 91.

For those CI signals above the noise level at locations (i,j) at which there are thermocouples as determined at 93, the CI evaluator performs the routine shown in FIG. 10 which checks for a malfunctioning thermocouple at the cited location by eliminating the reading from the thermocouple. As shown in FIG. 10, the current lack of confidence factor C for the thermocouple in question, and the current curvature index CI array calculated with that thermocouple value, are stored at 97 and 99, respectively. The lack of confidence factor C for the thermocouple in question is then set to a high value at 101 and the surface spline fit for RD at all fuel assembly locations is regenerated at 103. The new RD values are then used at 105 to recalculate the CIs. The CIs in the local region around the thermocouple in question are then evaluated at 107 in the manner discussed above. If a bad thermocouple signature is detected at 107, the originally stored values of C and the CI array are restored at 109 and 111 and the program returns to FIG. 9A at the "yes" branch from the insert.

If a bad thermocouple signature is not detected at 107, the C value for the location under examination and the original CI array are restored at 113 and 115 and the program returns to FIG. 9A and the "no" branch from the insert.

Returning to FIG. 9A from the "yes" branch from the insert, if the location under examination is a location of a thermocouple in this train as determined at 117, then the confidence factor C for this fuel assembly is changed in the library 65 to a large value, such as for example, 1,000, and a "new bad T/C in this train" message is generated at 121. If the location under examination at 117 is not in this train, a "new bad T/C in another train" message is generated at 123.

Whether the fuel assembly being examined has a thermocouple or not, if there is a control rod at this location, as determined at 125 in FIG. 9B, the CIs in the region surrounding this fuel assembly are examined at 127 to determine if they show a moved rod signature. If they do, the absolute value of the CI is examined at 129 in FIG. C to determine whether it is compatible with normal control rod movement or a dropped rod. As soon as a dropped rod is detected, a safety system grade rod withdrawal stop signal is generated at 131 and transmitted to the rod control system at 133 and a "rod withdrawal stop actuated" alarm is generated at 135.

If the magnitude of CI at 129 is less than the limit 2, a rod movement flag for the rod at the coordinates R,S is set at 137. This flag contains the CI value and rod group assignment. The program then loops back to FIG. 9A to examine the next fuel assembly location.

If the fuel assembly being examined has a CI value above the limit 1, but is not the location of a thermocouple or a control rod, a determination is made at 139 in FIG. 9B as to whether the fuel assembly is within a five by five assembly array of a control rod which has moved. If the fuel assembly is within the proximity of a moved control rod which would explain the CI value, the program loops back to FIG. 9A to examine the next fuel assembly. If this fuel assembly is not within the proximity of an identified moved control rod, or a moved control rod signature was not identified at 127, then a "anomalous train behavior" alarm is generated at 141 before the program loops back to 87.

Figure 11A:
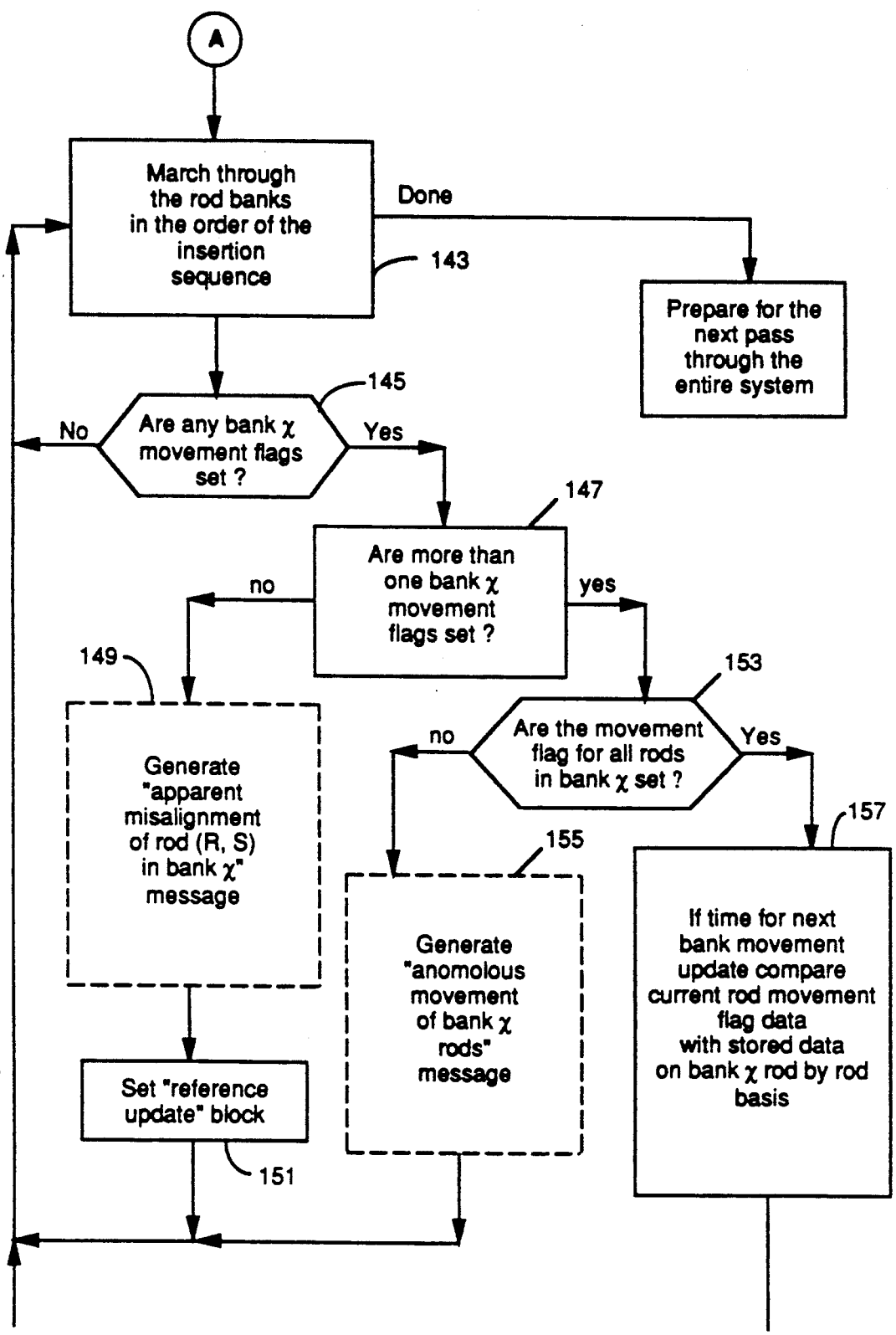
FIGS. 11A and B illustrate a flow chart for a rod movement analyzer which forms part of the train of FIG. 5.
Figure 11B:
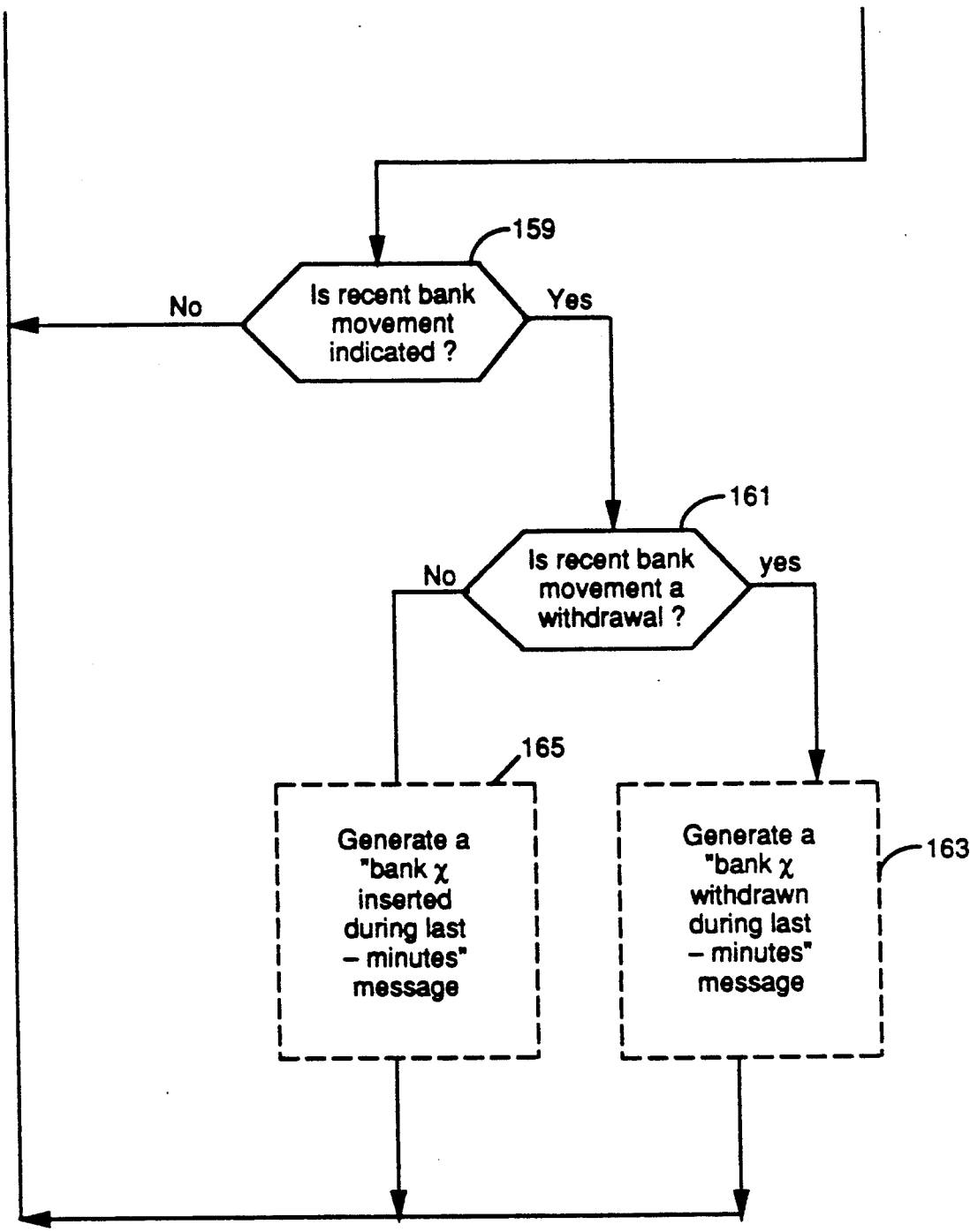

FIGS. 11A and 11B illustrate the flowchart for the rod movement analyzer. As indicated in connection with the description of FIG. 9A, when all the fuel assemblies with significant CI values have been evaluated, this routine is called to analyze detected rod movements. This is done by cycling through the rod banks in the order of insertion sequence as indicated at 143 in FIG. 11A to determine if there are any flags set indicating a movement of a control rod in the bank as indicated at 145. If only one rod movement flag is set in the bank as determined at 147, then an "apparent misalignment of rod (R,S) in bank X" message is generated at 149 and the "reference update" block is set at 151. This prevents changing of the references at 70 in FIG. 7. If the movement of more than one but not all of the rods in the bank have been detected at 153, then an "anomalous movement of bank X rods" message is generated at 155.

If there are indications that all of the rods in the bank have moved at 153, and the time has arrived for a bank movement update as indicated at 157, the current rod movement flag data is compared on a rod by rod basis with the stored data on that bank. If recent bank movement is indicated at 159 in FIG. 11B and that movement is indicated as being a withdrawal at 161, a "bank X withdrawn during last_minutes" message is generated at 163. For a rod insertion, a corresponding message is generated at 165.

The rod movement analyzer does not provide precise information on rod movement, but rather, provides an indication of which rods have moved and in which direction which can be compared with the rod position indicator system. The rod analyzer functions primarily serve as a confidence builder for the operator by providing information on rod movement which can be cross-checked against other systems to provide an indication of the reliability of the system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of protecting a pressurized water reactor having a reactor core with fuel assemblies through which a reactor coolant is circulated from a cold leg to a hot leg, said method comprising the steps of:

providing safety system grade core exit thermocouples at selected fuel assemblies across said reactor core;

automatically measuring core exit temperatures at the selected fuel assemblies at which said safety system grade core exit thermocouples are located;

automatically measuring average core inlet and outlet temperatures with safety system grade temperature sensors at said cold leg and hot leg;

automatically analyzing with a safety system grade analyzer said pattern of exit temperatures and said average core inlet and outlet temperatures to identify a dropped control rod; and automatically blocking with safety system grade means withdrawal of control rods from said reactor core when a dropped rod is identified.

2. The method of claim 1 wherein said step of analyzing comprises:

automatically calculating a relative power deviation for each fuel assembly from said core exit temperatures, and from said average core inlet and outlet temperatures;

automatically calculating curvature indices for said fuel assemblies from said relative power deviations; and automatically recognizing a dropped control rod from said curvature indices.

3. The method of claim 2 further including automatically recognizing a malfunctioning thermocouple from said curvature indices.

4. The method of claim 3 including automatically adjusting said calculating a relative power deviation for each assembly for a malfunctioning thermocouple.

5. The method of claim 2 where said calculating a relative power deviation for each fuel assembly comprises applying the relationship:

$$RD(L,M) = 100 \left[ \frac{\Delta T(L,M)}{\Delta T_O(L,M)} \cdot \frac{\Delta T_{O Avg}}{\Delta T_{Avg}} - 1.0 \right] \quad \text{(Eq. 1)}$$

where:

(L,M) = Thermocouple location
$\Delta T$ = Temperature rise in full assembly
$\Delta T_O$ = Temperature rise in full assembly at reference condition
$\Delta T_{Avg}$ = Temperature rise across reactor vessel
$\Delta T_{O\ Avg}$ = Temperature rise across reactor vessel at reference condition.

6. The method of claim 5 where said calculating curvature indices comprises applying the relationship:

$$CI(i,1j) = 4*RD(i,j) - [RD(i-1,j) + RD(i+1,j) + RD(i,j-1) + RD(i,j+1)].$$

7. The method of claim 5 including periodically updating said temperature rise in fuel assembly and temperature rise across said core at reference conditions.

8. The method of claim 7 wherein said periodically updating comprises use of core maps generated by an incore detector system.

9. The method of claim 8 wherein said periodically updating comprises periodically analytically determining use of core maps generated by an incore detector system.

10. The method of claim 7 wherein said periodically updating comprises tracking a trend in control rod movement from said core exit temperatures and average core inlet and outlet temperatures, comparing said trend in control rod movement with an independently determined control rod position, and when said trend in control rod movement is substantially confirmed by said independently determined control rod position, updating said temperature rise in fuel assembly at reference condition and said temperature rise across reactor vessel at reference condition to current values of said temperature rise in fuel assembly and temperature rise across reactor vessel.

* * * * *